US009524607B2

(12) United States Patent
Carranza

(10) Patent No.: US 9,524,607 B2
(45) Date of Patent: *Dec. 20, 2016

(54) ELECTRONIC GAMING DEVICE WITH REARRANGEABLE REELS

(71) Applicant: Cadillac Jack, Inc., Duluth, GA (US)

(72) Inventor: Alejandro Carranza, Lawrenceville, GA (US)

(73) Assignee: Cadillac Jack, Inc., Duluth, GA (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/578,358

(22) Filed: Dec. 20, 2014

(65) Prior Publication Data

US 2015/0105140 A1 Apr. 16, 2015

Related U.S. Application Data

(63) Continuation of application No. 13/490,168, filed on Jun. 6, 2012, now Pat. No. 8,944,907.

(51) Int. Cl.

| | |
|---|---|
| *A63F 9/24* | (2006.01) |
| *A63F 13/00* | (2014.01) |
| *G06F 17/00* | (2006.01) |
| *G06F 19/00* | (2011.01) |
| *G07F 17/32* | (2006.01) |
| *G07F 17/34* | (2006.01) |

(52) U.S. Cl.

CPC ........... *G07F 17/3213* (2013.01); *G07F 17/32* (2013.01); *G07F 17/3265* (2013.01); *G07F 17/3267* (2013.01); *G07F 17/34* (2013.01)

(58) Field of Classification Search

CPC .................................................. G07F 17/3213

USPC .......................................................... 463/20

See application file for complete search history.

*Primary Examiner* — Kevin Y Kim

(74) *Attorney, Agent, or Firm* — Weide & Miller, Ltd.

(57) ABSTRACT

Examples disclosed herein relate to systems and methods, which allow a player, the gaming device, and/or the gaming system to rearrange the symbols on the reels to represent winning payline patterns.

20 Claims, 16 Drawing Sheets

ELECTRONIC GAMING DEVICE WITH REARRANGEABLE REELS

CROSS-REFERENCE TO RELATED PATENT APPLICATION

This application is a continuation of and claims prior to application Ser. No. 13/490,168 entitled "ELECTRONIC GAMING DEVICE WITH REARRANGEABLE REELS", filed on Jun. 6, 2012, which is incorporated herein by reference in its entirety.

BACKGROUND

Field

The subject matter disclosed herein relates to an electronic gaming device. More specifically, the disclosure relates to an electronic gaming device that provides gaming options relating to the ability to move symbols and/or symbol areas on reels before, during, and/or after game play.

Information

The gaming industry has numerous casinos located both worldwide and in the United States. A client of a casino or other gaming entity can gamble via various games of chance. For example, craps, roulette, baccarat, blackjack, and electronic games (e.g., slot machines) where a person may gamble on an outcome.

Paylines of an electronic gaming device (e.g., slot machine) are predetermined winning symbols being aligned in a predetermined pattern as defined by the electronic gaming device. A winning event occurs when the player successfully matches the predetermined winning symbols in one of the predetermined patterns. In this disclosure, a player, the gaming device, and/or the gaming system may be allowed to rearrange the symbols on the reels to represent winning payline patterns.

BRIEF DESCRIPTION OF THE FIGURES

Non-limiting and non-exhaustive examples will be described with reference to the following figures, wherein like reference numerals refer to like parts throughout the various figures.

FIG. 5(*b*) is an illustration of modified reels (i.e., rearranged symbols and/or reels) displayed on the electronic gaming device, according to one embodiment.

FIG. 5(*c*) is an illustration of reels and symbols displayed on the electronic gaming device, according to one embodiment.

FIG. 5(*d*) is an illustration of modified reels (i.e., rearranged symbols and/or reels) on the electronic gaming device to make a winning combination, according to one embodiment.

FIG. 5(*e*) is an illustration of modified reels (i.e., rearranged symbols and/or reels) on the electronic gaming device to make a winning combination, according to one embodiment.

FIG. 6(*b*) is an illustration of modified reels (i.e., rearranged symbols and/or reels) on the electronic gaming device to make an optimal winning combination, according to one embodiment.

FIG. 6(*c*) is an illustration of an alternate modified reel (i.e., rearranged symbols and/or reels) on the electronic gaming device to make a winning combination, which may be non-optimal, according to one embodiment.

DETAILED DESCRIPTION

Figure 1:
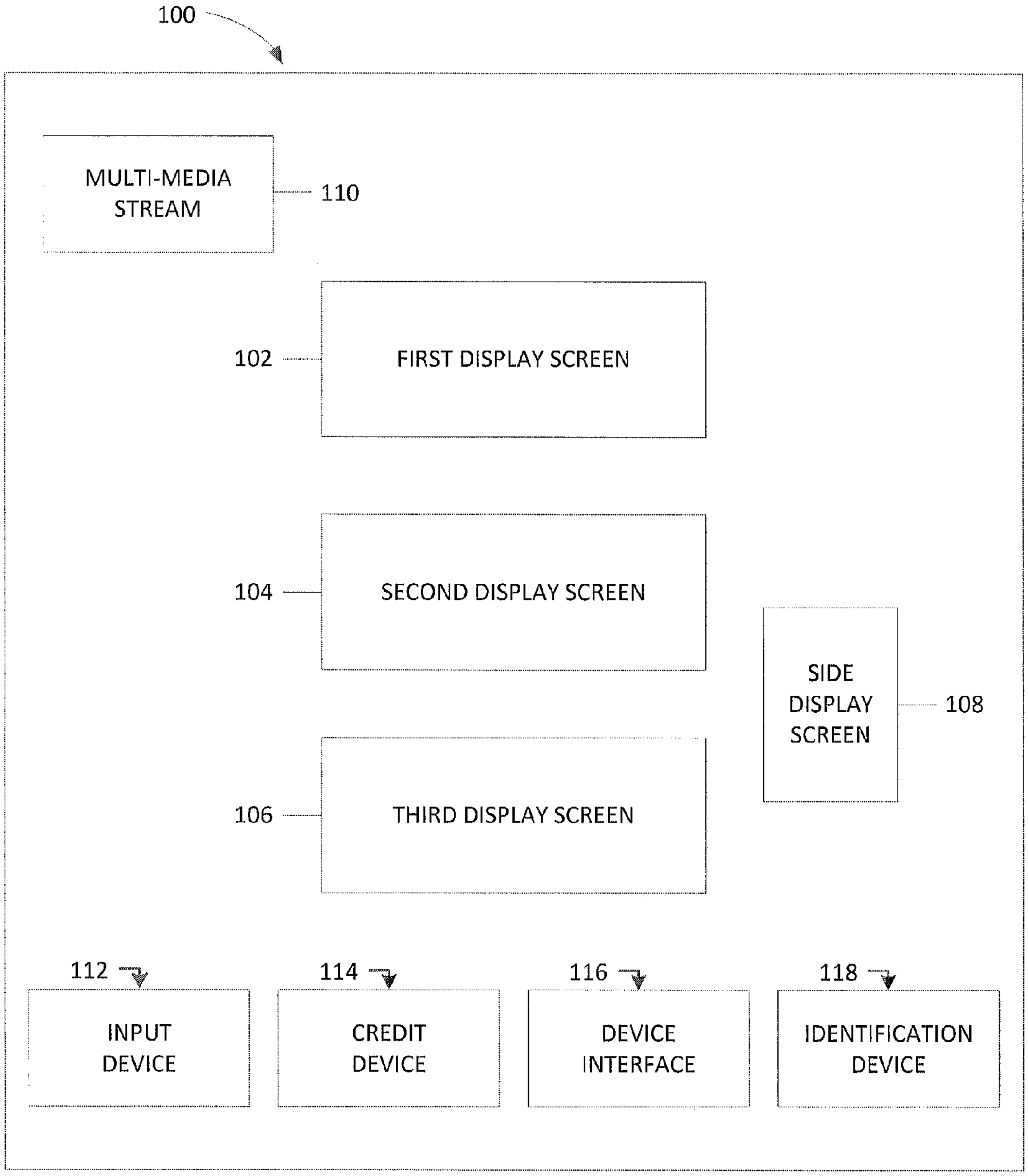
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an internet event, and/or any combination thereof. In another example, the wagering event may be a poker tournament, a horse race, a car race, and/or any combination thereof. The advertisement may be an advertisement for the casino, a restaurant, a shop, any other entity, and/or any combination thereof. The sporting event may be a football game, a baseball game, a hockey game, a basketball game, any other sporting event, and/or any combination thereof. All of these multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to select a row and/or column to move, to select a row area to move, to select a column area to move, to select a symbol to move, to select a game rearranging optimization option, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, or any combination thereof.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, or any combination thereof.

Device interface 116 may be utilized to connect a player to electronic gaming device 100 through a mobile device, card, keypad, identification device 118, or any combination thereof. Device interface 116 may include a docking station by which a mobile device is plugged into electronic gaming machine 100. Device interface 116 may include an over the air connection by which a mobile device is connected to electronic gaming machine 100 (e.g. Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have row rearrangement gaming options only. Therefore, no column rearrangement options would be presented. In another example, the player may only want options related to column rearrangements. Therefore, no row rearrangement options would be presented. In another example, the player may only want two row options (e.g., top row and bottom row) to be presented. Therefore, no other row or column options would be presented.

Identification device 118 may utilize biometrics (e.g. thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

For example, a single large image could be partially displayed on second display screen 104 and partially displayed on third display screen 106, so that when both display screens are put together they complete one image. Electronic gaming device 100 may stream or play prerecorded multimedia 110, and the media may be displayed on first display screen 102.

Figure 2:
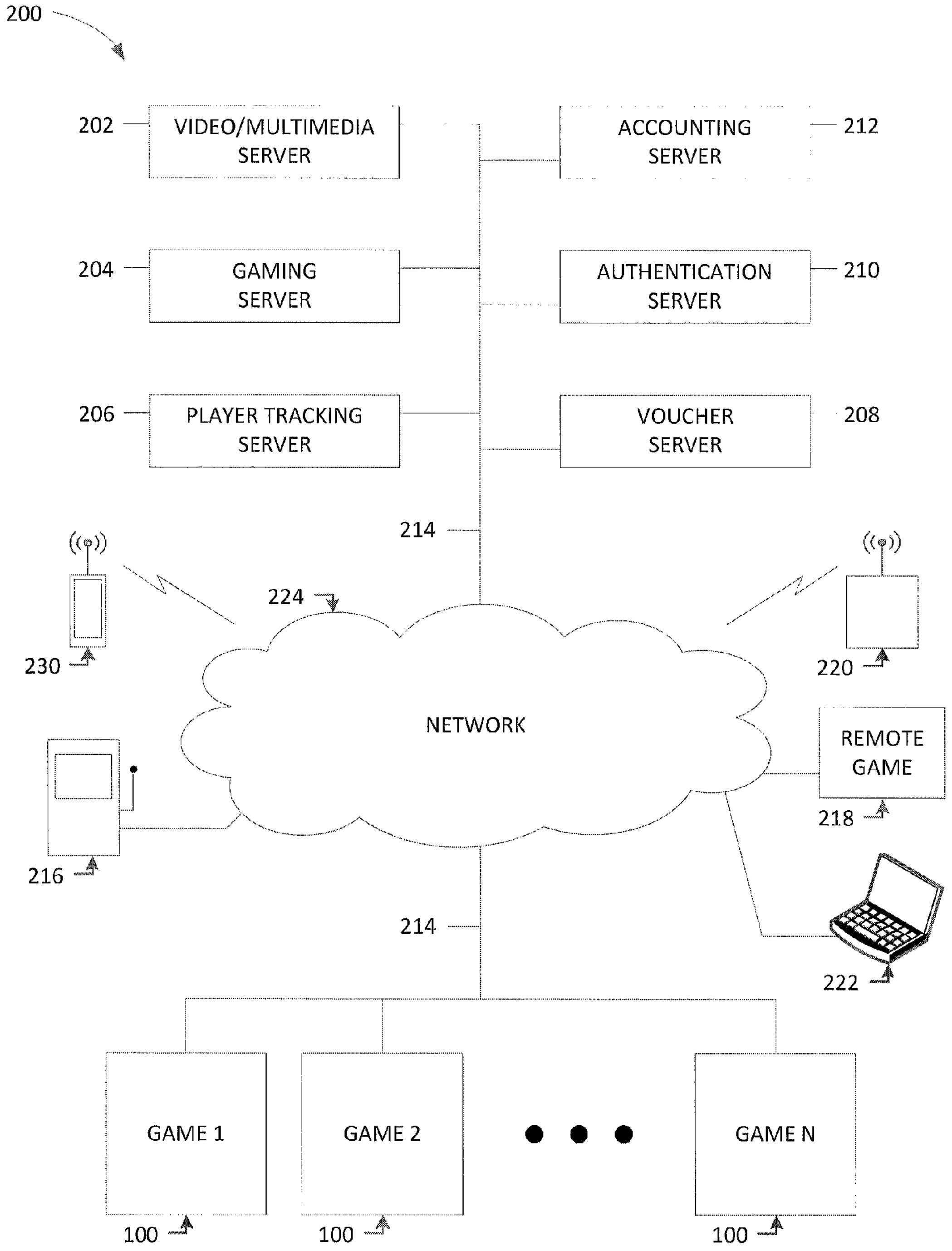
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the internet, a private network, or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/Multi-media server 202 may transmit these video streams via network link 214 and/or network 224.

For example, a remote gaming device at the same location may be a casino with multiple casino floors, a casino that allows wagering activities to take place from the room, a casino that may allow wagering activities to take place from the pool area, etc. In another example, the remote devices may be at another location, such a progressive link to another casino, or a casino corporation that owns many different casinos (e.g. MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes.

Player tracking server 206 may track a player's betting activity, a player's preferences (e.g., language, font, sound level, drinks, etc.). Based on data obtained by player tracking server 206, a player may be eligible for gaming rewards (e.g. free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include columns, rows, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for player's tracked outcomes.

Network connection 214 may be used for communication between dedicated servers, thin clients, thick clients, back-office accounting systems, etc.

Laptop computer 222 and/or any other electronic device (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (such as cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components such as network interface cards, repeaters and hubs, bridges, switches, routers, firewalls, or any combination thereof may also be part of network 224.

Figure 3:
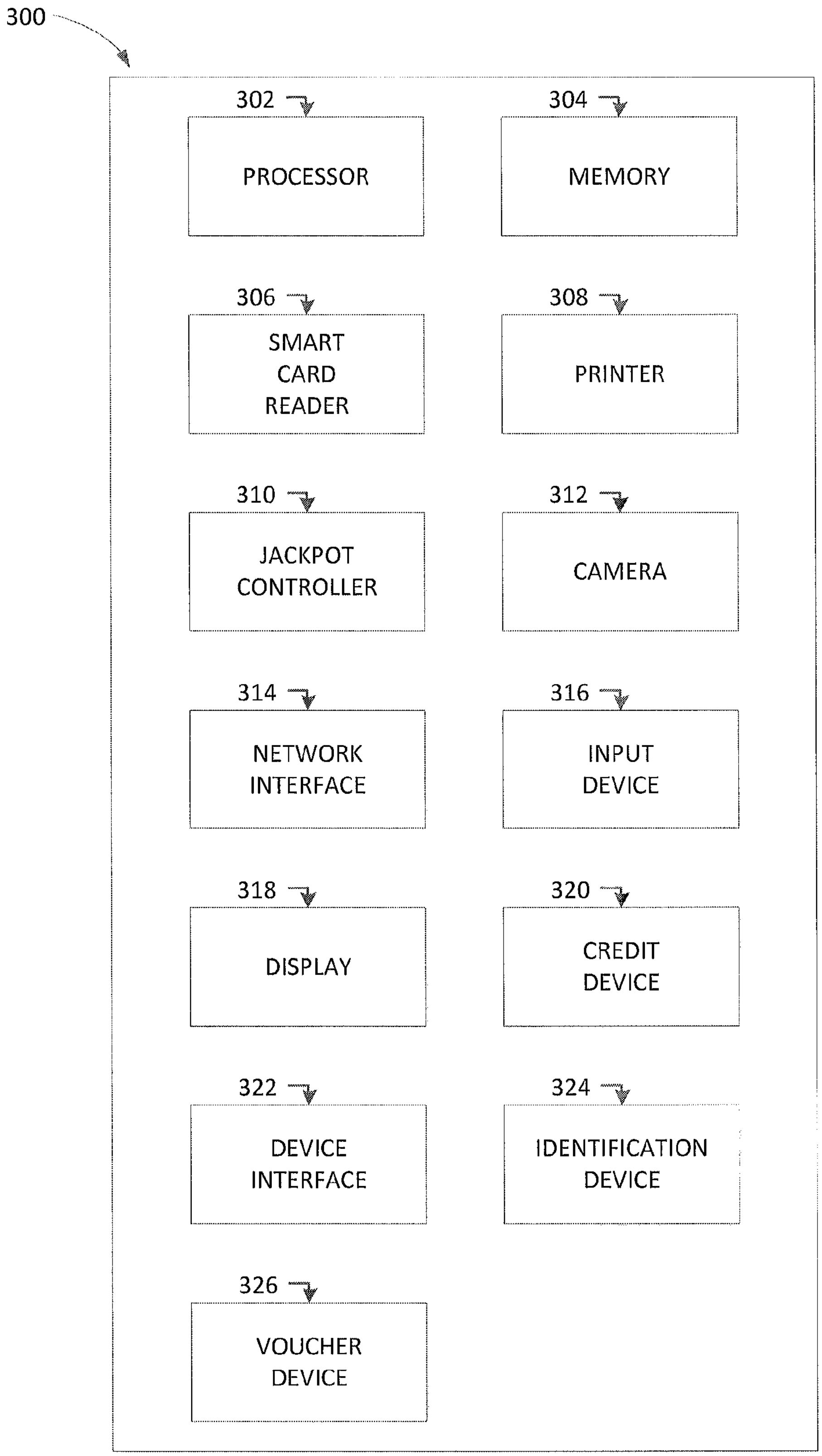
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308 and/or video or pictures captured by camera 312 may be saved and stored on memory 304. Memory 304 may include a confirmation module, which may authenticate a value of a voucher and/or the validity of the voucher. The processor may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory such as read-only memory ("ROM"), erasable programmable read-only memory ("EPROM"), electrically erasable programmable read-only memory ("EEPROM"), flash memory ("NVRAM"), or Nano-RAM (carbon nanotube random access memory), and/or any combination thereof.

Memory 304 may also be volatile semiconductor memory such as dynamic random access memory ("DRAM") or static random access memory ("SRAM"), and/or any combination thereof.

Memory 304 may also be a data storage device such as a hard disk drive, an optical disk drive such as CD, DVD, or Blu-ray, a solid state drive, a memory stick, a CompactFlash card, a USB flash drive, a Multi-media Card, an xD-Picture Card, or any combination thereof.

Memory 304 may be used to store read-only program instructions for execution by processor 302, for the read-write storage for global variables and static variables, read-write storage for uninitialized data, read-write storage for dynamically allocated memory, and for the read-write storage of the data structure known as "the stack", or any combination thereof.

Memory 304 may be used to store the read-only pay table information for which symbol combinations on a given payline that result in a win (payout) are established for games of chance such as slot games and video poker.

Memory 304 may be used to store accounting information (such as cashable electronic promotion in, non-cashable electronic promotion out, coin in, coin out, bill in, voucher in, voucher out, electronic funds transfer in, etc.).

Memory 304 may be used to record error conditions on an electronic gaming device 100 such as door open, coin jam, ticket print failure, ticket (paper) jam, program error, reel tilt, etc., or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (i.e., a wagering instrument with a fixed waging value that can only be used for non-cashable credits), drink tokens, comps, or any combination thereof.

Electronic gaming device 100 may include a jackpot controller 310, which may allow electronic gaming device

100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include their image into the game play. A picture of a player may be an actual image as taken by camera 312. A picture of a player may be a computerized caricature of image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Video obtained by camera 312 may then be used as part of game play, or may be used for security purposes. For example, a camera located on electronic gaming device 100 may capture video of a potential illegal activity (e.g. tampering with the machine, crime in the vicinity, underage players, etc.).

Network interface 314 may allow electronic gaming device 100 to communicate with video server 202, gaming server 204, player tracking server 206, voucher server 208, authentication server 210, and/or accounting server 212.

Input device 316 may be mechanical buttons, electronic buttons, a touch screen, or any combination thereof. Input device 316 may be utilized to make a wager, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g. sporting event 1, sporting event 2, sporting event 3), to request services (e.g., drinks, manager, etc.), or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow for game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with their mobile device (e.g. smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or alternate display screen as set in the player's options.

A voucher device 326 may generate, print, transmit, or receive a voucher. The voucher may represent a wagering option, a wagering structure, a wagering timeline, a value of wager, a payout potential, a payout, or any other wagering data. A voucher may represent an award, which may be used for other locations inside of the gaming establishment. For example, the voucher may be a coupon for the local buffet or a concert ticket.

Figure 4:
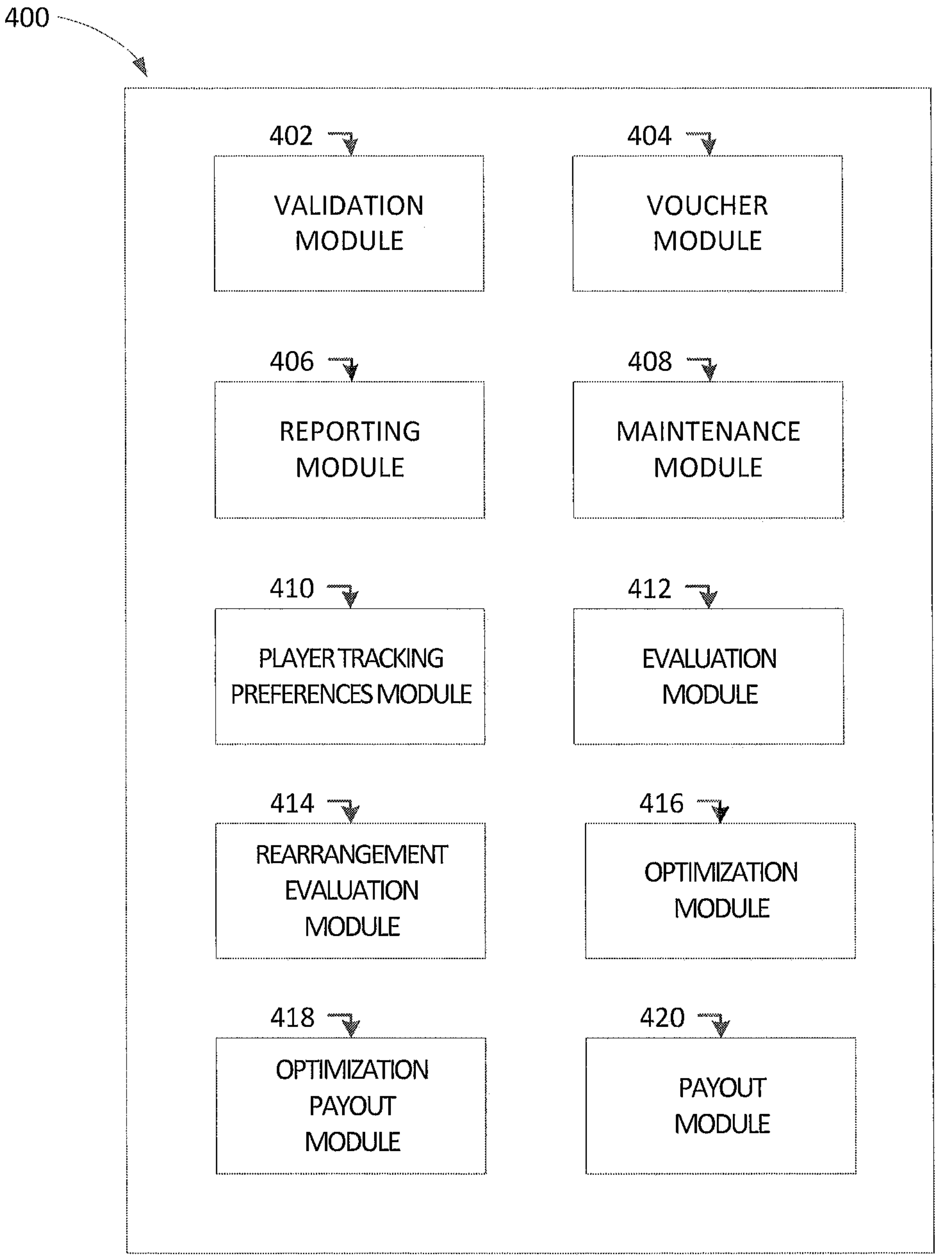
FIG. 4 is a block diagram of the electronic gaming device, according to one embodiment.
Figure 5A:
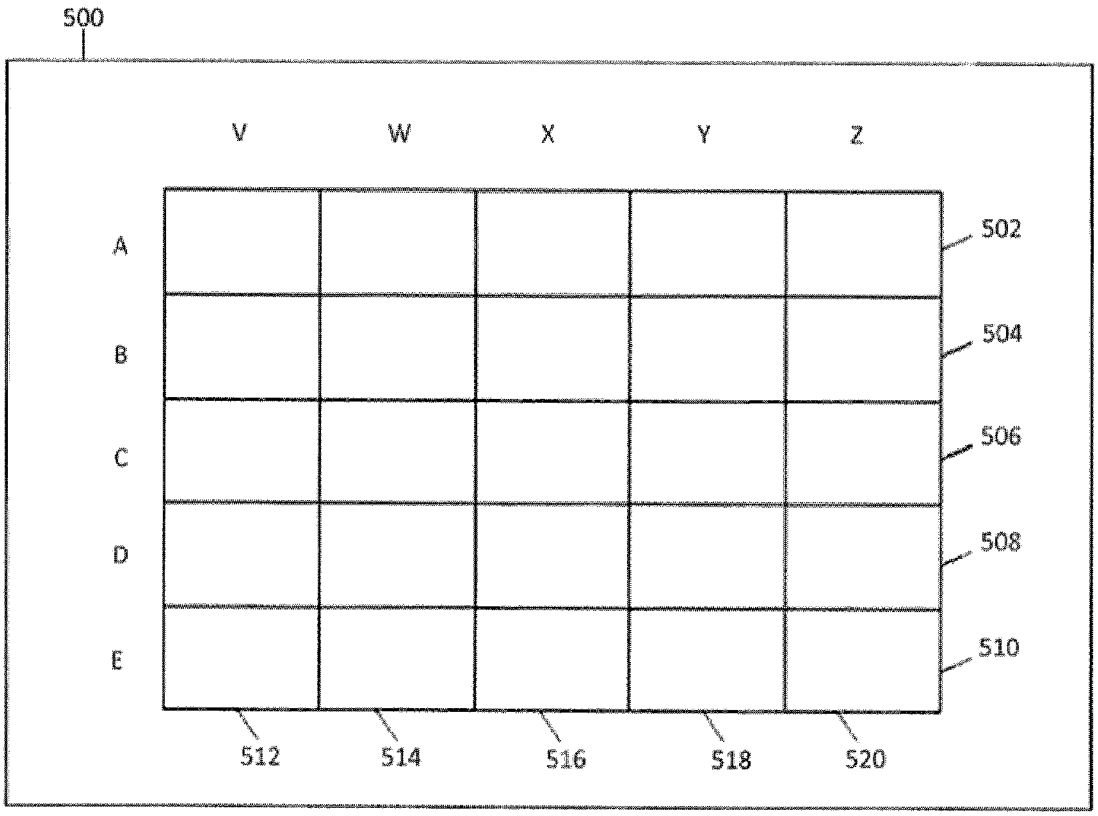
FIG. 5(*a*) is an illustration of paylines and reels of the electronic gaming device, according to one embodiment.
Figure 5B:
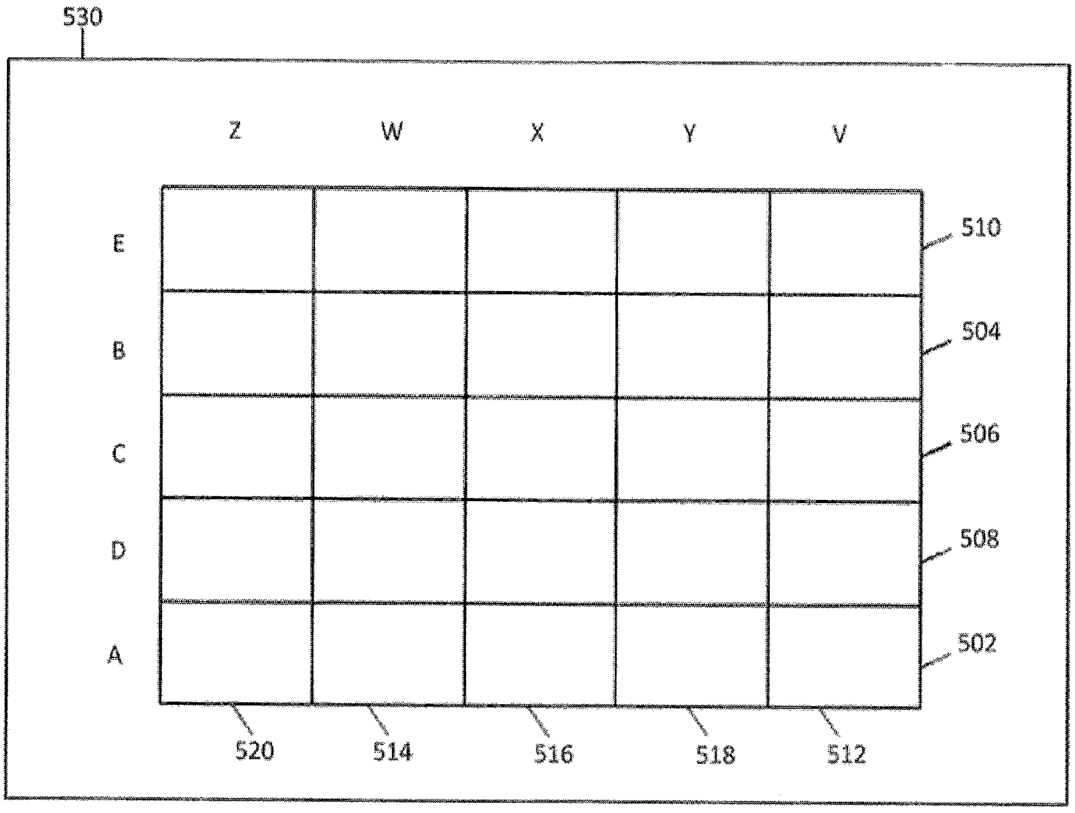
Figure 5C:
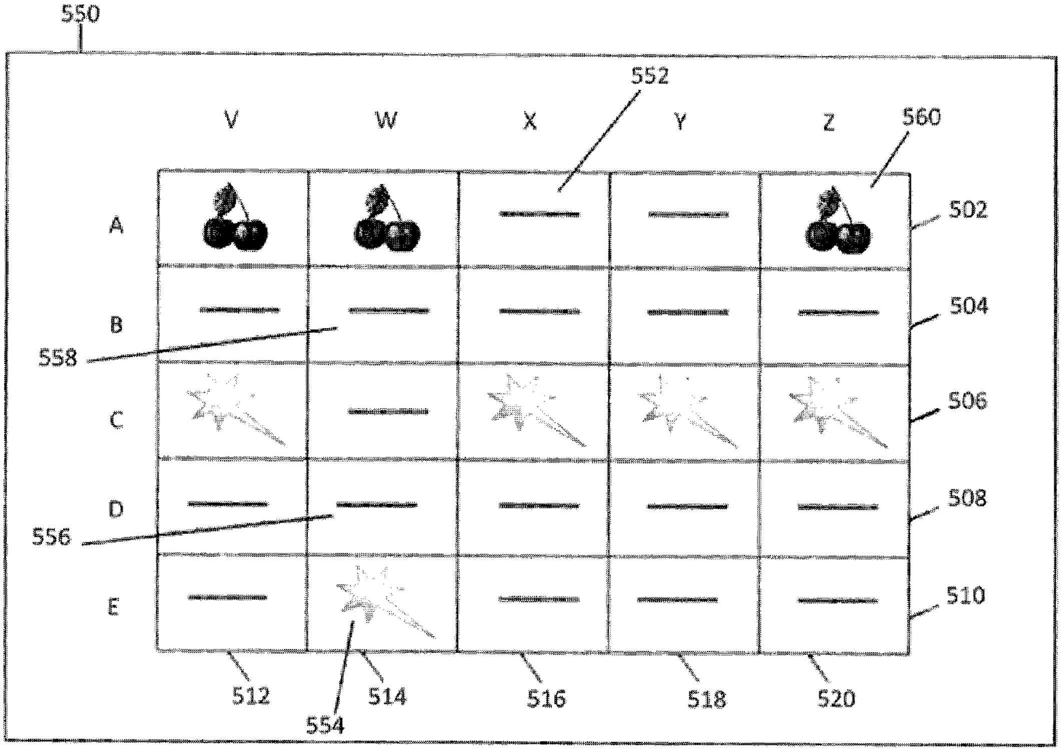
Figure 5D:
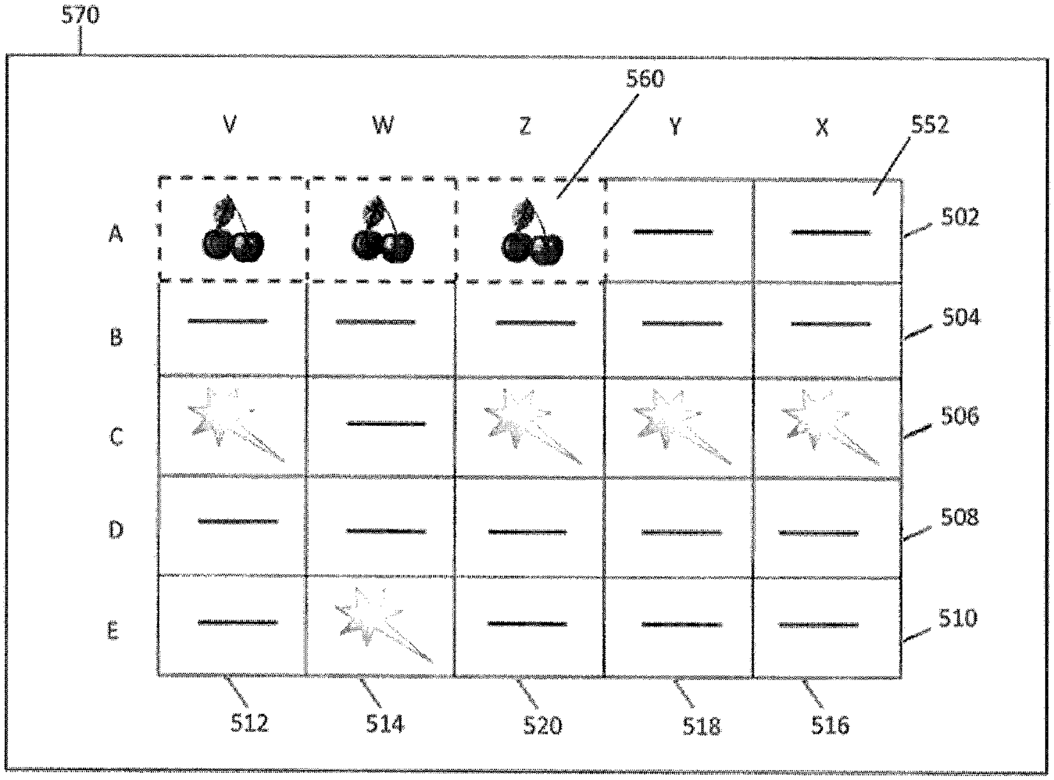
Figure 5E:
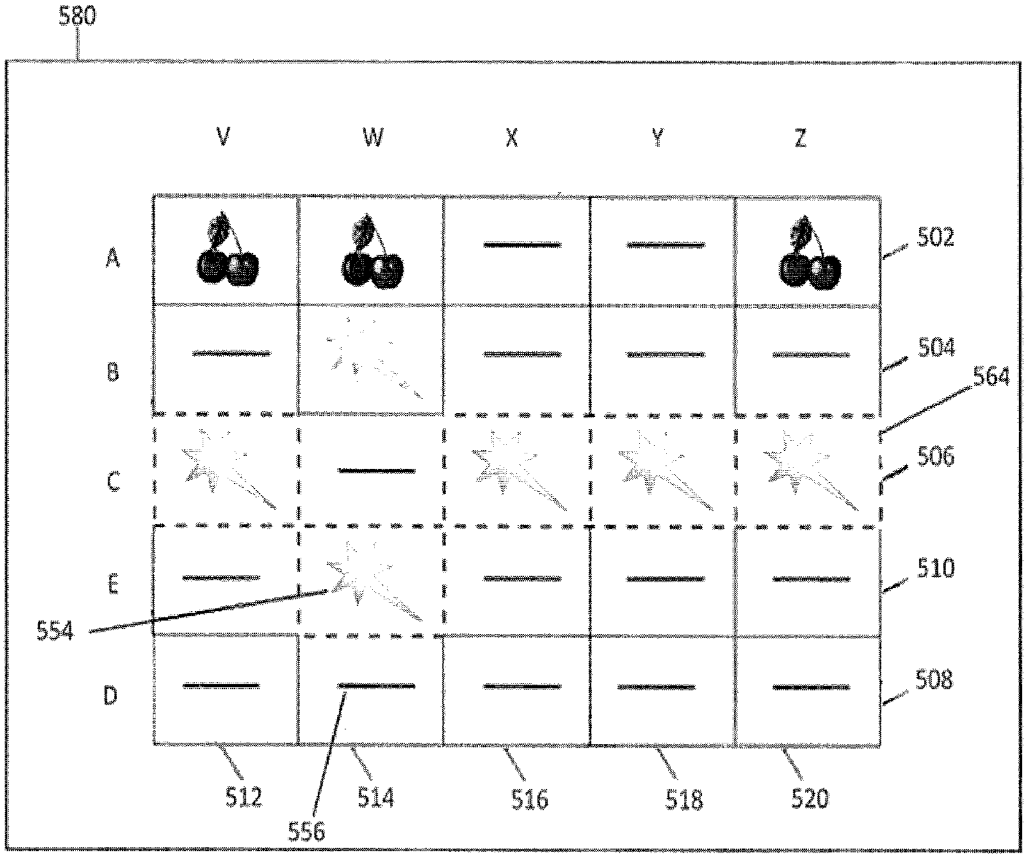

FIG. 4 shows a block diagram of memory 304, which includes various modules. Memory 304 may include a validation module 402, a voucher module 404, a reporting module 406, a maintenance module 408, a player tracking preferences module 410, an evaluation module 412, a rearrangement evaluation module 414, an optimization module 416, an optimization payout module 418, and a payout module 420.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Evaluation module 412 may determine payouts related to game results when there is no rearrangement of rows, columns, row areas, column areas, and/or symbols.

Rearrangement evaluation module 414 may determine payouts related to game results when there is one or more rearrangement of rows, columns, row areas, column areas, and/or symbols. It should be noted that evaluation module 412 and rearrangement evaluation module 414 may be combined into one module. Further, there may be one evaluation module where the determined payout does not depend on whether there were any rearrangements.

Optimization module 416 may determine the optimal (e.g., highest prize, highest free spins, etc.) that can be obtained by rearranging the rows, columns, row areas, column areas, and/or symbols.

Optimization payout module 418 may include one or more payout structures, which may be based on an automatic selection option, a time period for completing one or more rearrangements of rows, columns, row areas, column areas, and/or symbols, and/or a number of rearrangement moves.

For example, if a player makes a selection to have the gaming device/system determine the optimal solution, the payout may be decreased based on this automatic optimization selection being selected. In another example, the payout may be increased based on this automatic optimization selection. In another example, the payout may be not increased nor decreased based on this automatic optimization selection.

In another example, if the player rearranges the rows, columns, row areas, column areas, and/or symbols, then the payout may be increased based on the player making the selections. In another example, the payout may be decreased based on the player manually selecting the rearrangements. In another example, the payout may be not increased nor decreased based on the player manually selecting the rearrangements.

In another example, the payout may be increased based on the time period required for the player to make their final rearrangement selections. In another example, the payout may be decreased based on the time period required for the player to make their final rearrangement selections. In another example, the payout may be not increased nor decreased based on the time period required for the player to make their final rearrangement selections.

In another example, the payout may be increased based on the number of rearrangement moves required for the player to make their final rearrangement selections. In another example, the payout may be decreased based on the number of rearrangement moves required for the player to make their final rearrangement selections. In another example, the payout may be not increased nor decreased based on the number of rearrangement moves required for the player to make their final rearrangement selections.

Payout module 420 may include various payouts, which may include rearrangement payouts, non-rearrangement payouts, number of rearrangement moves payouts, and/or time-based payouts.

FIG. 5(*a*) shows a screen image 500 of paylines and reels for an electronic gaming device, according to one embodiment. Screen image 500 may include a predetermined number of columns (e.g., a first column 512, a second column 514, a third column 516, a fourth column 518, and a fifth column 520) and a predetermined number of rows (e.g., a first row 502, a second row 504, a third row 506, a fourth row 508, and a fifth row 510). Screen image 500 may include any number of rows and any number of columns. For example, screen image 500 may have five rows and ten columns; screen image 500 may have eight rows and thirteen columns, or any other combinations of rows and columns. A wagering event may be initiated by the player through input device 316. Images in each cell (e.g., first row 502/first column 512 (Row A, Column V), third row 506/second column 514 (Row C, Column W), fourth row 508/fourth column 518 (Row D, Column Y), etc.) may move up and/or down and/or side-to-side.

In a game, positioning of the images on the reels may be displayed to show the outcome of a wagering event (e.g. a win or a loss for the player) on screen image 500. For example, it may be that if all columns in first row 502 (e.g. first column 512, second column 514, third column 516, fourth column 518, and fifth column 520) have the same image (e.g. cherries, bars, pictures of the player as captured by camera 312, etc.) then a winning event has occurred. A winning combination (e.g., lining up of the images) may happen in numerous ways. For example, if all images in the cells (e.g., first row 502/first column 512 (Row A, Column V), first row 502/second column 514 (Row A, Column W), etc.), which are touching by a shared side (e.g. first row 502/first column 512 (Row A, Column V) and first row 502/second column 514 (Row A, Column W) or by a corner (e.g. first row 502/first column 512 (Row A, Column V) and second row 504/second column 514 (Row B, Column W) have the same image this may represent that a winning event has occurred.

FIG. 5(*b*) shows an illustration of modified reels (i.e., rearranged symbols, rows, columns, row areas, and column areas) on a modified screen image 530, according to one embodiment. Modified screen image 530 may include the ability to rearrange the displayed order of the symbols on screen image 500. Modified screen image 530 may be rearranged by switching the places of two or more symbols on screen image 500. Modified screen image 530 may be rearranged by switching the places of two or more rows of screen image 500 (e.g., first row 502 with second row 504, first row 502 with third row 506, etc.). Modified screen image 530 may be rearranged by switching the places of two or more columns of screen image 500 (e.g., first column 512 with fifth column 520, first column 512 with third column 516, etc.). Modified screen image 530 may be rearranged by switching one or more symbols, rows, columns, row areas, column areas, and/or any combination thereof. For example, modified screen image 530 shows an illustration of screen image 500 where the image has been rearranged by switching first column 512 with fifth column 520 while also switching first row 502 with fifth row 510.

FIG. 5(*c*) shows an illustration of screen image 550, which may represent the result from a wagering event, according to an exemplary embodiment. Screen image 500 may include a predetermined number of columns (first column 512, second column 514, third column 516, fourth column 518, and fifth column 520) and a predetermined number of rows (first row 502, second row 504, third row 506, fourth row 508, and fifth row 510). Screen image 500 may include any number of rows and any number of columns. The predetermined number of rows and predetermined number of columns creates cells for symbols. Screen image 550 may include representative symbols in each cell (e.g., a cherry in the cell represented by first row 502/first column 512 and the cell represented by first row 502/second column 514, etc.). Representative symbol locations may indicate if the wagering event was a win or a loss for the player. The symbols may be an image of a card, any symbol, and/or any other object. For example, the symbols may be a pot of gold, an ace of spades, a diamond, and/or any other symbol. The symbols may be an animation. The symbols may be a picture. For example, it may be a picture of the player as taken by camera 312. The symbols may be a number. The symbols may be any image. The symbols may be a blank.

Electronic gaming device 100 and/or electronic gaming system 200 may allow screen image 550 to be rearranged. For example, screen image 550 via electronic gaming device 100 and/or electronic gaming system 200 may include the ability to rearrange the displayed order of the symbols. Screen image 550 may be rearranged by switching the places of two or more symbols. Screen image 550 may be rearranged by switching the places of two or more rows (e.g. first row 502 with second row 504, first row 502 with third row 506, etc.). Screen image 550 may be rearranged by switching the places of two or more columns (e.g. first column 512 with fifth column 520, first column 512 with third column 516, etc.). Screen image 550 may be rearranged by switching one or more symbols, rows, columns, row areas, column areas, and/or any combination thereof.

In FIG. 5(*c*), fifth row 510, which includes a first star symbol 554, may be moved (or switched) with second row 504 or fourth row 508 to form a winning combination of five stars. If fifth row 510 is switched with second row 504, then first star symbol 554 would replace a first blank spot 558 to form the five star winning combination. If fifth row 510 is switched with fourth row 508, the first star symbol 554 would replace a second blank spot 556 to form the five star winning combination.

For example, FIG. 5(*d*) represents one embodiment of screen image 550 where the image has been rearranged by switching third column 516 with fifth column 520. This rearrangement causes the switching of a third blank spot 552 and a first cherry symbol 560, which may change the wagering event outcome from an initial loss to a win result (e.g., three cherries in a row equals a winning result). The switch of third blank spot 552 and first cherry symbol 560 may not change the wagering event outcome from an initial loss to a win result (e.g., three cherries in a row do not equal a winning result). Therefore, screen image 570 may or may not create a winning event based on the payout parameters and/or structures.

FIG. 5(*e*) represents an additional embodiment of screen image 550 where the image may be rearranged, according to an exemplary embodiment. For example, fourth row 508 may be switched with fifth row 510. This rearrangement would switch first star symbol 554 with second blank spot 556 to make a winning outcome. In another example, FIG. 5(*e*) may be rearranged by switching fifth row 510 with second row 504 to make a winning outcome. The rearranging of symbols, columns, rows, row areas, and/or column areas may take place in any combination or position.

Electronic gaming device 100 and/or electronic gaming system 200 may award the player with the ability to rearrange the symbols, columns, rows, row areas, and/or column areas as an award for a winning event. Further, electronic gaming device 100 and/or electronic gaming system 200 may allow for rearrangements of the symbols, columns, rows, row areas, and/or column areas in the base game. In addition, electronic gaming device 100 and/or electronic gaming system 200 may allow for rearrangements of the symbols, columns, rows, row areas, and/or column areas in the bonus game. In addition, electronic gaming device 100 and/or electronic gaming system 200 may allow for rearrangements of the symbols, columns, rows, row areas, and/or column areas by the player paying an additional wager (e.g., side bet). In addition, electronic gaming device 100 and/or electronic gaming system 200 may allow for rearrangements of the symbols, columns, rows, row areas, and/or column areas based on any combination of the above.

Screen image 580 may represent a winning event to the player based on the same image being displayed in an entire row (e.g. third row 506) after the rearrangement. For example, first star symbol 554 may be moved to the cell represented by the intersection of third row 506 and second column 514 to form five stars in a row on third row 506. Screen image 580 may represent a winning event to the player based on the same image being displayed in an entire column (e.g. second column 514) after the rearrangement. Screen image 580 may represent a winning event to the player based on the same image being displayed in any predetermined pattern after the rearrangement.

Figure 6A:
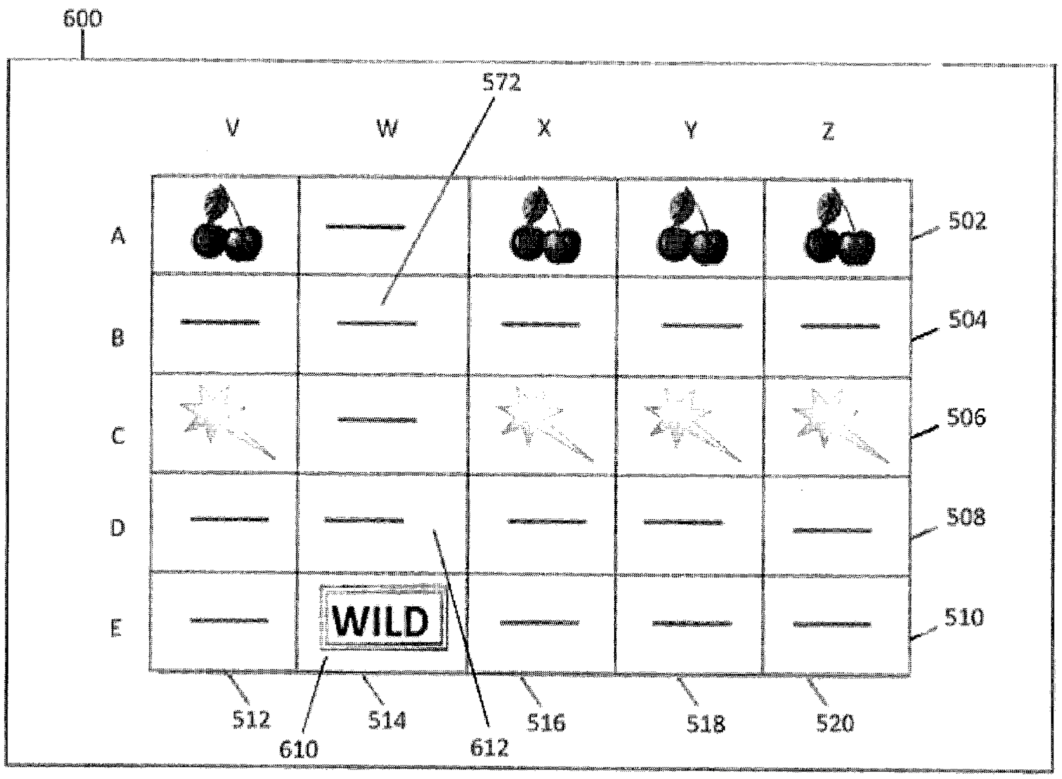
FIG. 6(*a*) is an illustration of paylines and reels of the electronic gaming device, according to one embodiment.
Figure 6B:
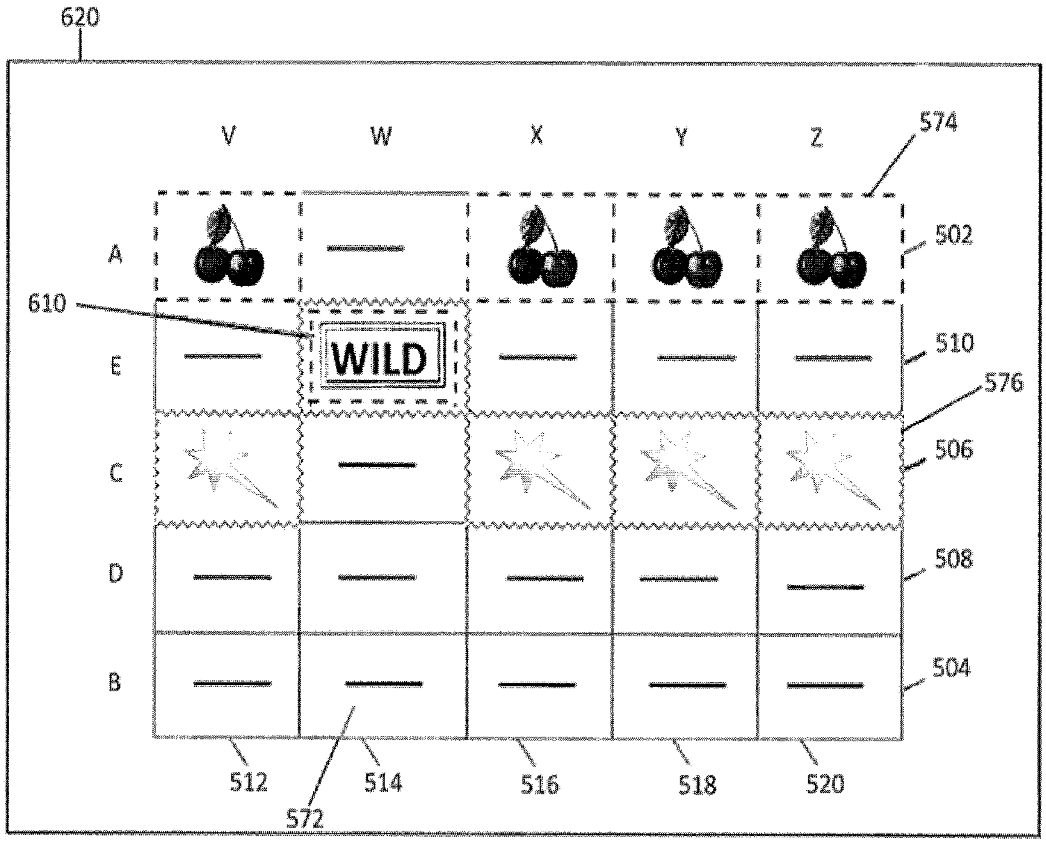
Figure 6C:
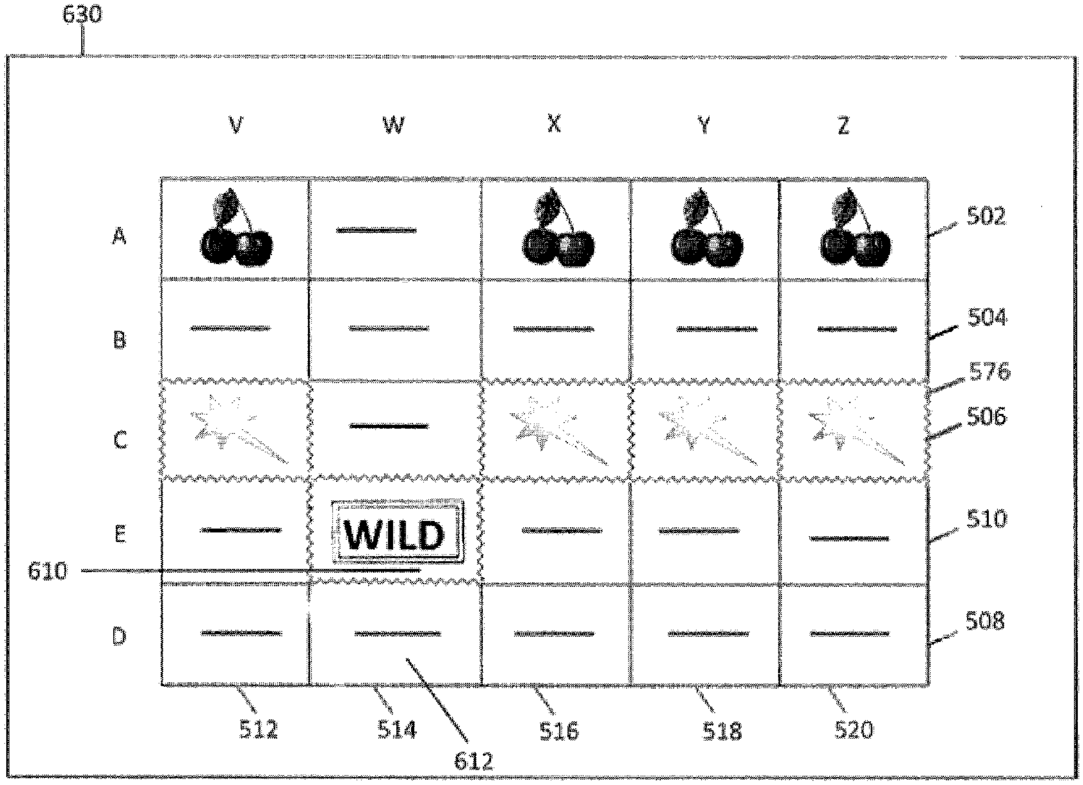

FIG. 6(*a*) shows an illustration of a screen image 600, which may represent the result from an initial wagering event, according to one embodiment. Screen image 600 may include a predetermined number of columns (e.g., first column 512, second column 514, third column 516, fourth column 518, and fifth column 520) and a predetermined number of rows (e.g., first row 502, second row 504, third row 506, fourth row 508, and fifth row 510). Screen image 600 may include any number of rows and any number of columns. For example, screen image 600 may have five rows and ten columns, screen image 600 may have eight rows and thirteen columns, or any other combinations of rows and columns. The predetermined number of rows and predetermined number of columns creates cells for symbols. Screen image 600 may include representative symbols in each cell (e.g., a cherry in cell first row 502/first column 512 and a cell in first row 502/third column 516, etc.). Representative symbol locations may indicate if the wagering event was a win or a loss. The symbols may be an image of a card, any symbol, and/or other objects. For example, the symbols could be a pot of gold, an ace of spades, a diamond, and/or any other symbol. The symbols may be an animation. The symbols may be a picture. For example, the symbols may be a picture of the player as taken by camera 312. The symbols may be a number. The symbols may be any image. The symbols may be a blank.

In FIG. 6(*a*) a first wild symbol 610 may be switched/moved to a fourth blank spot 572 or a fifth blank spot 612 to create a potential winning combination, according to an exemplary embodiment. For example, fifth row 510 may be switched with second row 504. In another example, the cell represented by first wild symbol 610 may be switched with the cell represented by fourth blank 572. Any cell may be switched with any other cell. For example, the cell represented by first row 502/first column 512 may be switched with the cell represented by fifth row 510/fifth column 520, the cell represented by third row 506/fourth column 518, the cell represented by first row 502/third column 516, etc.

Screen image 600 via electronic gaming device 100 and/or electronic gaming system 200 may include the ability to rearrange the displayed order of the symbols, rows, columns, row areas, and/or column areas. Screen image 600 may be rearranged by switching the places of two or more symbols. Screen image 600 may be rearranged by switching the places of two or more rows (e.g., first row 502 with second row 504, first row 502 with third row 506, etc.). Screen image 600 may be rearranged by switching the places of two or more columns (e.g., first column 512 with fifth column 520, first column 512 with third column 516, etc.). Screen image 600 may be rearranged by switching one or more symbols, rows, columns, row areas, column areas, and/or any combination thereof.

For example, FIG. 6(*b*) represents one embodiment of screen image 600 where the image has been rearranged by switching second row 504 with fifth row 510. This rearrangement causes the switching of first wild symbol 610 and fourth blank spot 572, which may change the wagering event outcome from an initial loss to a win. The win created by the switching may be optimal (i.e., maximize the available jackpot and/or payout). The win created by the switching may not be optimal (i.e., the player wins, but not the maximum amount they could have won). The switching may not change the wagering event outcome from an initial loss to a win.

For example, when first wild symbol 610 is switched with fourth blank spot 572, an optimal outcome of all the available outcomes is achieved. The outcome is optimal because the movement of first wild symbol 610 allows both a first winning payline 574 (e.g., a five cherries combination) and a second winning payline 576 (e.g., a five star combination) to achieve a winning event, while no other location of first wild symbol 610 on screen image 620 would allow for two or more winning events. For example, moving first wild symbol 610 to the cell represented by fifth row 510/first column 512 would not yield a winning combination. In another example, moving first wild symbol 610 to the cell represented by first row 502/second column 514 would only yield a five cherry result, which may be equaled to the payout achieved by first winning payline 574.

FIG. 6(*c*) represents an additional embodiment of screen image 600 where the image may be rearranged by switching fourth row 508 with fifth row 510. This rearrangement causes the switching of first wild symbol 610 with the cell represented by fourth row 508/second column 514 to make a winning outcome, which may have the same value as second winning payline 576 (e.g., a five star combination). Screen image 630 may represent a winning event. Screen image 630 may represent a non-optimal winning event. The outcome may not be optimal because the rearrangement of first wild symbol 610 with the cell represented by fourth row 508/second column 514 only allows for one winning payline, whereas two winning paylines were available by switching first wild symbol 610 with fourth blank spot 572.

The award for a winning outcome may be decreased for use of a rearrangement option. For example, obtaining five cherries in a row may equal 100 credits. However, if a player utilizes the rearrangement options to obtain five cherries in a row, the award for five cherries in a row may equal 75 credits. The award for a winning outcome may not be decreased for use of a rearrangement. The award may be increased for use of the rearrangement. For example, obtaining five cherries in a row may equal 100 credits. However, if a player utilizes the rearrangement options to obtain five cherries in a row, the award for five cherries in a row may equal 160 credits. The award for a winning outcome may be decreased for use of the automated optimization option. For example, obtaining five bars in a row may equal 300 credits. However, if a player utilizes the automated rearrangement options to obtain five bars in a row, the award for five bars in a row may equal 100 credits. The award for a winning outcome may not be decrease for use of the automated optimization option. The award for winning may be increased for use of the automated optimization option. For example, obtaining five bars in a row may equal 300 credits. However, if a player utilizes the automated rearrangement options to obtain five bars in a row, the award for five bars in a row may equal 400 credits.

Utilizing the automatic rearrangement options may change the payout in various ways. For example, if the player elects to use the optimization option it may increase the odds of the player having an improved outcome. The perceived decrease in risk may lead to a decrease in a payout amount. For example, if the player is required to make an additional wager (i.e., side bet) for the ability to rearrange or utilize the optimization feature, then the award may remain unchanged or even increase the award that would have been available to a player who didn't make this election.

Figure 7:
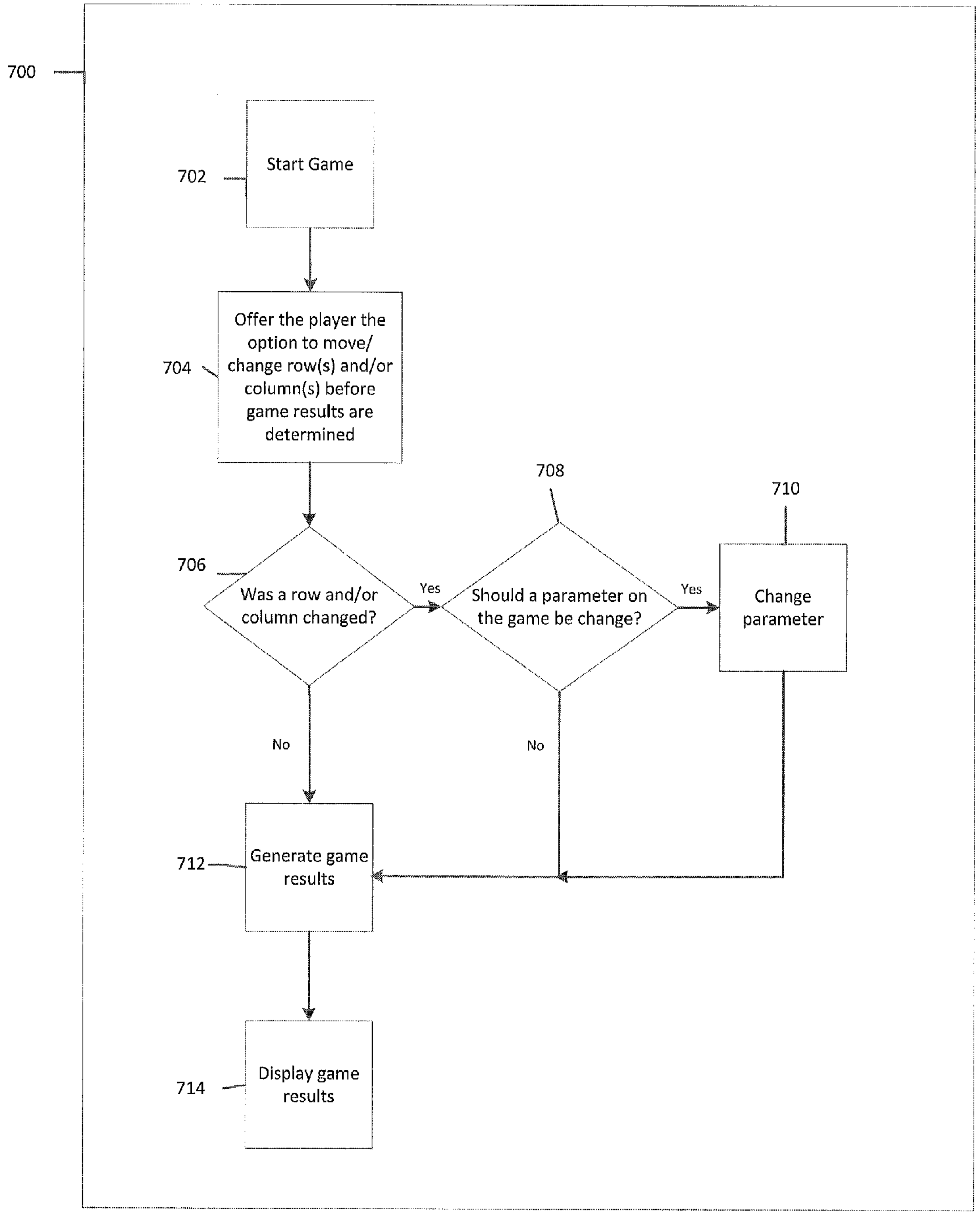
FIG. 7 is a flow diagram for allowing the modification of the reels (i.e., rearranging the symbols and/or reels) before the game's initial outcome has been determined, according to one embodiment.

In FIG. 7, a rearrangement of symbols, reels, rows, columns, row areas, and/or column areas before the initial game outcome flow diagram 700 is shown, according to an exemplary embodiment. The method may include the game starting (step 702). The method may include the player being offered the option to rearrange the symbols, reels, rows, columns, row areas, and/or column areas positions (step 704). The method may include electronic gaming device 100 and/or electronic gaming system 200 determining whether a rearrangement was implemented (step 706). If no rearrangement was implemented, then the system may generate the game results (step 712) and display the game results (step 714). If there were one or more rearrangements, then electronic gaming device 100 and/or electronic gaming system 200 may determine whether the parameters for the game should be changed (step 708). If the parameters should not be changed, then the system may generate the game results (step 712) and display the game results (step 714). If the parameters should be changed, then the system may change one or more parameter (step 710). The method may further include the system generating the game results (step 712) and displaying the game results (step 714).

Figure 8:
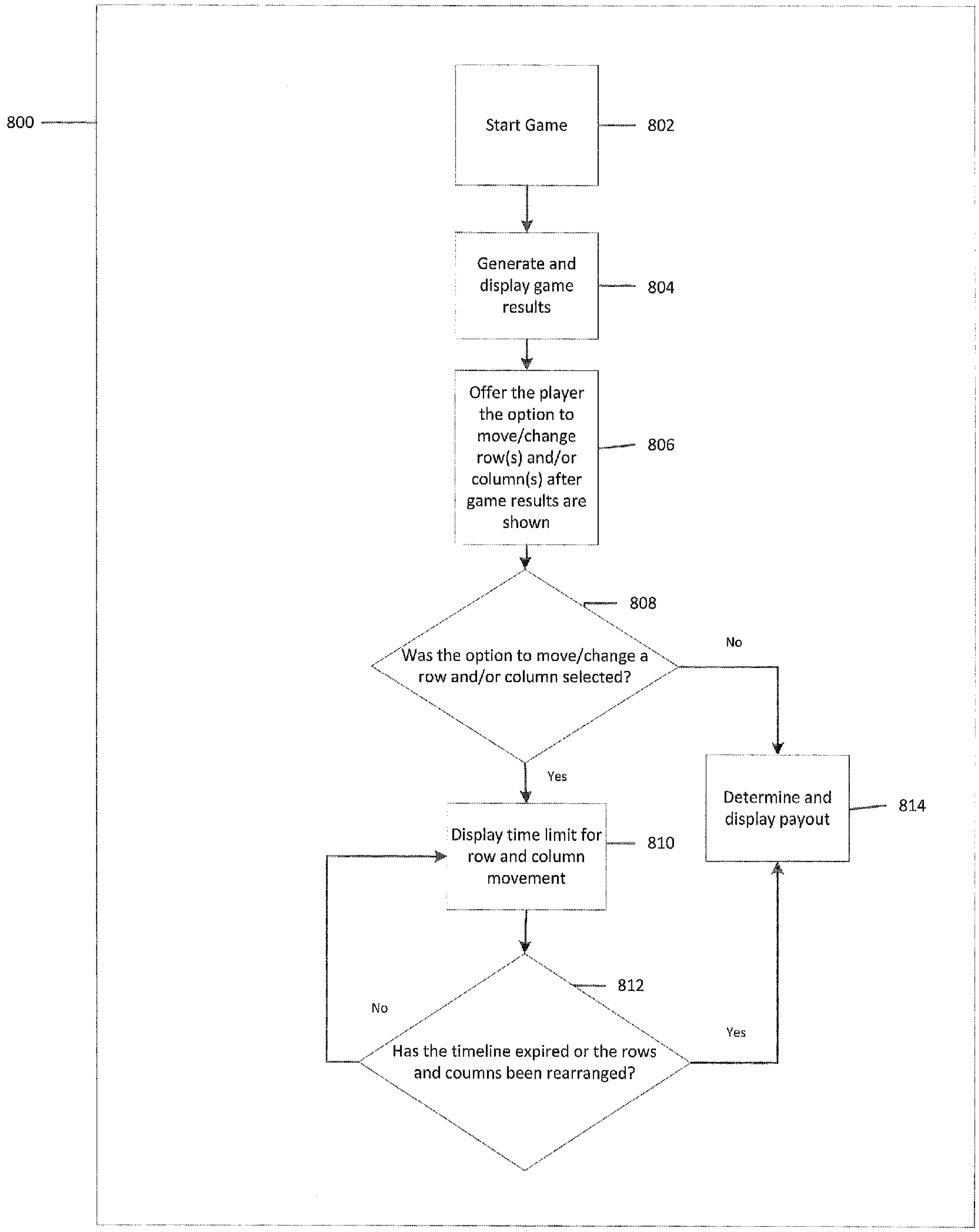
FIG. 8 is a flow diagram for allowing the modification of the reels (i.e., rearranging the symbols and/or reels) after the game's initial outcome has been determined, but before the game's final outcome has been determined, according to one embodiment.

In FIG. 8, a flow diagram 800 of a rearrangement of the symbols, reels, rows, columns, row areas, and/or column areas after the initial outcome is generated is shown, according to one embodiment. The method may include the game starting (step 802). The method may include the generation of and displaying of the initial game result (step 804). The method may include offering the player the option to rearrange the initial game results as originally displayed in step 804 (step 806). The method may include electronic gaming device 100 and/or electronic gaming system 200 determining whether the rearrangement option was elected (step 808). If the rearrangement option was not elected, then the system determines and displays the payout (step 814). If the rearrangement option was elected, the method may include displaying a time limit for the rearrangement to take place (step 810). The method may include electronic gaming device 100 and/or electronic gaming system 200 determining whether the rearrangement is completed (step 812). Additionally, the method may include electronic gaming device 100 and/or electronic gaming system 200 determining whether the time limit has expired (step 812). The method may include that if no rearrangement was elected or if the rearrangement was not completed before time expires, then the system may generate and display the outcome/payout (step 814). Additionally, the method may include if the rearrangement was completed, then the system may generate and display the outcome/payout based on the rearrangement (step 814).

Figure 9:
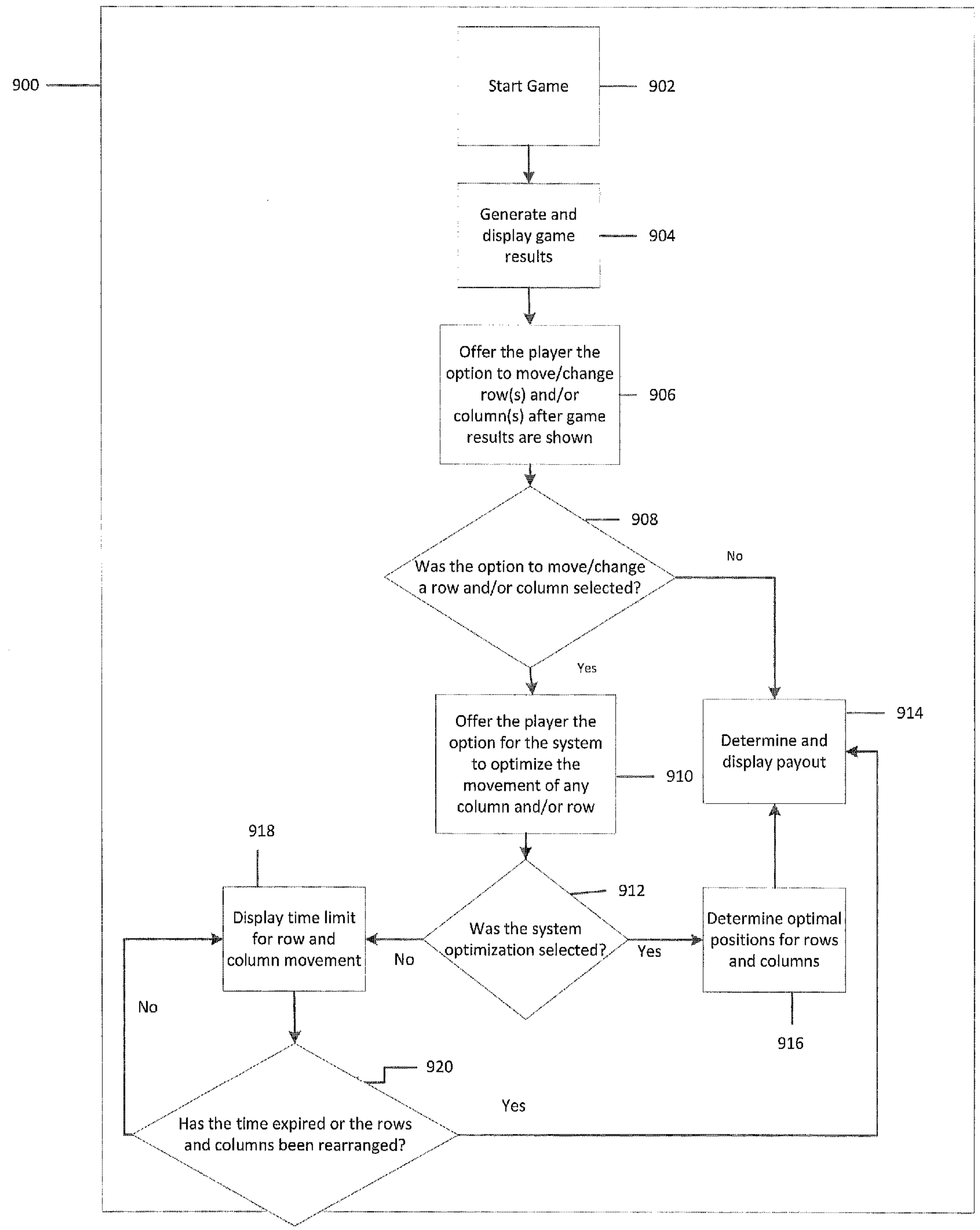
FIG. 9 is a flow diagram for allowing the modification of the reels (i.e., rearranging the symbols and/or reels) after the game's initial outcome has been determined, but before the game's final outcome has been determined, according to one embodiment.

In FIG. 9, a flow diagram 900 of a rearrangement of the symbols, reels, rows, columns, row areas, and/or column areas after the initial outcome was determined with the option for optimization the payout is shown, according to an exemplary embodiment. The method may include the game starting (step 902). The method may include generating and displaying of the initial game results (step 904). The method may include offering the player the option to rearrange the initial game results as original shown in step 904 (step 906). The method may include electronic gaming device 100 and/or electronic gaming system 200 determining whether the rearrangement option was elected (step 908). If the rearrangement option was not elected, then the system may determine and display a payout (step 914). If the rearrangement option was elected, the method may include offering the player an automated optimal rearrangement option (step 910). The method may include electronic gaming device 100 and/or electronic gaming system 200 determining whether the optimization was elected (step 912). Additionally, if the optimization option was elected, the method may include the optimal placement being determined (step 916) and displaying the payout (step 914). If the optimization option was not selected, the method may include displaying a time limit for the rearrangement to take place (step 918). The method may include electronic gaming device 100 and/or electronic gaming system 200 determining whether the rearrangement is completed (step 920). Additionally, the method may include electronic gaming device 100 and/or electronic gaming system 200 determining whether the time limit has expired (step 920).

Figure 10:
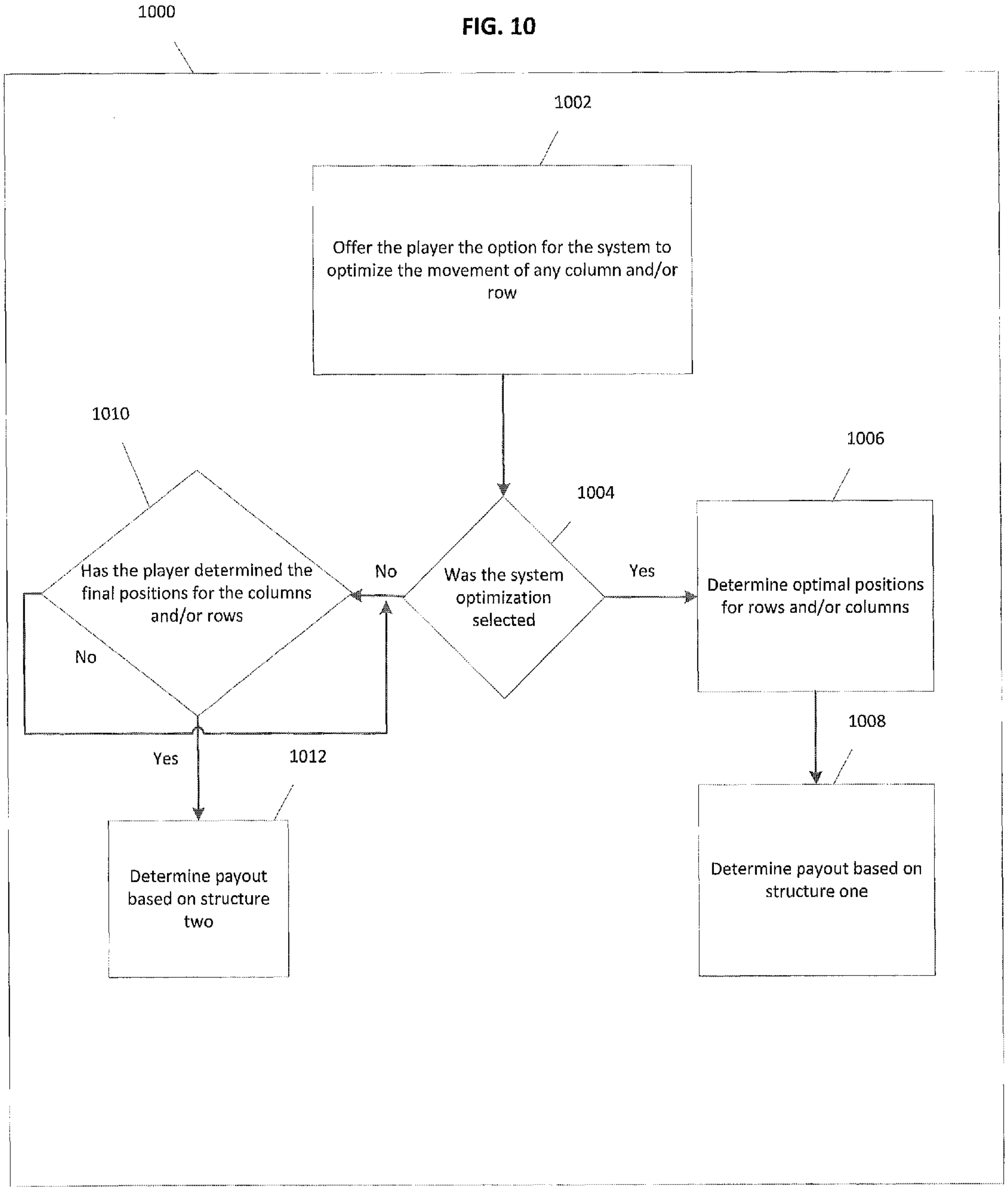
FIG. 10 is a flow diagram for allowing the modification of the reels (i.e., rearranging the symbols and/or reels) into the optimal winning position after the game's initial outcome has been determined, but before the game's final outcome has been determined, according to one embodiment.

In FIG. 10, a flow diagram 1000 for a rearrangement automated optimization selection is shown, according to an exemplary embodiment. The method may include displaying a rearrangement automated optimization selection option (step 1002). The method may include electronic gaming device 100 and/or electronic gaming system 200 determining whether the rearrangement automated optimization selection option was elected (step 1004). Additionally, if the rearrangement automated optimization selection option was elected, the method may include the optimal placement (e.g., symbols, rows, columns, row areas, column areas, and/or any combination thereof) being determined (step 1006) and determining a payout based on structure one (step 1008). If optimization was not elected, the method may include electronic gaming device 100 and/or electronic gaming system 200 determining whether the rearrangement is completed (step 1010). The method may include if the rearrangement was completed, without optimization, that a payout will be made based on structure two (step 1012). Additionally, the method may include if the rearrangement was completed with optimization, that a payout will be made based on structure one (step 1008). For example, if the rearrangement automated optimization option is selected, the risk to the player of making a mistake is reduced. Due to this reduction in risk, the corresponding award could also be modified (e.g., increased or decreased). In another example, if the rearrangement automated optimization option is selected, the time between game plays may be reduced, which may also lead to the corresponding award being modified (e.g., increased or decreased).

Electronic gaming device 100 and/or electronic gaming system 200 may also allow the player to elect to have the game further modify the reels to optimize the outcome if the player's modification is not optimal.

In one example, the electronic gaming device may include a plurality of reels. The plurality of reels may include a first reel at a first location and a second reel at a second location. The electronic gaming device may include a processor, which may move the first reel to the second location and the second reel to the first location.

In another example, the processor may generate a payout based on a movement of the first reel and the second reel. The electronic gaming device may include a memory, which includes a payline module. The payline module may include a plurality of payline structures.

In another example, a movement of the first reel and the second reel may be based on the processor receiving movement data from a player. The movement of the first reel and the second reel may be based on the processor automatically moving the first reel and the second reel. The movement of the first reel and the second reel may be activated based on a secondary wager.

The first reel may include a first symbol in a first area in a first row and a second symbol in a second area in a second row. The processor may move and/or switch the first symbol to the second area in the second row and move and/or switch the second symbol to the first area in the first row.

The processor may determine a payout based on a movement of the first symbol to the second area in the second row and the second symbol to the first area in the first row. The electronic gaming device may include a network interface, which may receive data from at least one of a server and one or more gaming devices. The electronic gaming device may include a display, which may modify an image of one or more potential movement options. The electronic gaming device may include a player preference input device. The player preference input device may modify a game configuration based on data from an identification device.

In another example, a method of providing gaming options via an electronic gaming device may include displaying a plurality of reels. The plurality of reels may include a first reel at a first location and a second reel at a second location. The method may include moving the first reel to the second location and the second reel to the first location.

In another example, the method may include generating a payout based on a movement of the first reel and the second reel. Further, the movement of the first reel and the second reel may be based on the processor receiving movement data from a player. The movement of the first reel and the second reel may be automatically implemented.

In another example, the electronic gaming system may include a server, which includes a server memory and a server processor. The server processor may display a plurality of reels. The plurality of reels may include a first reel at a first location and a second reel at a second location. The processor may further move the first reel to the second location and the second reel to the first location.

In another example, the server processor may generate a payout based on a movement of the first reel and the second reel. The movement of the first reel and the second reel may be based on the server processor receiving movement data from a player. The movement of the first reel and the second reel may be activated based on a secondary wager.

In one exemplary embodiment, the electronic gaming device and/or electronic gaming system may rearrange the information (e.g., symbols) on the display screen and may not be able to include any new data (e.g., new symbols) that were not shown on the display screen prior to the rearrangement feature occurring. For example, the player may only be able to rearrange the current reels/symbols shown on the display screen which were the results of a reel spin, but this rearrangement may not make any symbols which were not visible at the start of the rearrangement feature visible at the end of initial reel spin.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:

a monetary funds accepting mechanism for accepting monetary funds in creating a player credit balance;

at least one display device;

at least one player input device;

a memory device;

a processor; and machine-readable code stored in said memory device executable by said processor to, in response to a wager placed by a player from said player credit balance, cause said at least one display device to display a first reel at a first location and a second reel at a second location, a third reel at a third location and a fourth reel at a fourth location, to implement a first movement before presentation of an initial outcome of said game comprising causing the at least one display device to display said first reel moved to the second location and to cause the at least one display device to display said second reel moved to the first location, to cause said at least one display device to display an initial game outcome, and where the processor is further configured to allow a second movement which occurs after presentation of said initial game outcome where the second movement is that said third reel at said third location moves to said fourth location and that said fourth reel moves to the third location, creating a modified outcome.

2. The electronic gaming device of claim 1, wherein the processor is further configured to generate a payout based on at least one of a winning initial outcome and a winning modified outcome, said payout comprising a number of credits added to said player's credit balance.

3. The electronic gaming device of claim 1, wherein the processor is further configured to allow a third movement before presentation of said initial game outcome where the third movement is that a fifth reel at a fifth location moves to the third location and that the third reel moves to the fifth location, the processor is further configured to allow a fourth movement which occurs after presentation of said initial game outcome where the fourth movement is that the fifth reel at the third location moves to the fifth location and that the third reel moves to the third location.

4. The electronic gaming device of claim 3, wherein the processor is further configured to generate a payout for winning outcomes based on at least one of the first movement, the second movement, the third movement, and the fourth movement.

5. The electronic gaming device of claim 1, wherein the processor is further configured to allow a fifth movement which occurs before presentation of said initial game outcome, where the fifth movement is that the first reel at the first location moves to a third location and that a third reel at the third location moves to the second location and the second reel moves to the first location.

6. The electronic gaming device of claim 5, wherein the processor is further configured to generate a payout for winning outcomes based on at least one of the first movement, the second movement, the third movement, the fourth movement, and the fifth movement.

7. The electronic gaming device of claim 1, wherein the processor is further configured to allow a fifth movement which occurs after presentation of said initial game outcome where the fifth movement is that the first reel at the first location moves to a third location and that a third reel at the third location moves to the second location and the second reel moves to the first location.

8. The electronic gaming device of claim 7, wherein the processor is further configured to generate a payout for winning outcomes based on at least one of the first movement, the second movement, the third movement, the fourth movement, and the fifth movement.

9. The electronic gaming device of claim 8, wherein the processor is further configured to allow a sixth movement which occurs before presentation of said initial game outcome where the sixth movement is that the first reel at the first location moves to the third location and that the third reel at the third location moves to the second location and the second reel moves to the first location.

10. The electronic gaming device of claim 9, wherein the processor is further configured to generate a payout for winning outcomes based on at least one of the first movement, the second movement, the third movement, the fourth movement, the fifth movement, and the sixth movement.

11. The electronic gaming device of claim 1 wherein said processor is configured to implement said first movement based upon a player selection of said first movement via said at least one player input device and implement said second movement based upon a player selection of said second movement via said at least one player input device.

12. A method of providing gaming options via an electronic gaming device comprising:

receiving via a credit device an item associated with a monetary value;

establishing via the one or more processors a credit balance based at least in part on the received item;

receiving via a wager button a wager amount on a play of a game, wherein the wager amount is deducted from the credit balance;

displaying via at least one display device a first reel at a first location, a second reel at a second location, a third reel at a third location, and a fourth reel at a fourth location; and displaying, at said at least one display device before presentation of an initial game outcome, a first movement comprising the first reel moved to the second location and the second reel moved to the first location;

presenting an initial game outcome; and displaying, at said at least one display device after presentation of said initial game outcome, a second movement comprising the third reel moved to the fourth location and the fourth reel moved to the third location to create a modified game outcome.

13. The method of claim 12, further comprising generating a payout based on a winning outcome of at least one of the initial game outcome and the modified game outcome.

14. The method of claim 12, further comprising displaying a firth reel at a fifth location and displaying, via said at least one display device before presentation of said initial game outcome, a third movement comprising the fifth reel moved to the third location and the third reel moved to the fifth location.

15. The method of claim 14, further comprising generating a payout for a winning outcome based on at least one of the first movement, the second movement, and third movement.

16. The method of claim 14, further comprising displaying, via said at least one display device after presentation of said initial game outcome, a fourth movement comprising the fifth reel moved to the fifth location and the third reel moved to the third location.

17. The method of claim 16, further comprising generating a payout for winning outcomes based on at least one of the first movement, the second movement, third movement, and the fourth movement.

18. The method of claim 12 wherein said first movement is implemented based upon a first player input to at least one player input device and said second movement is implement based upon a second player input to said at least one player input device.

19. The electronic gaming device of claim 1 wherein said processor is configured to cause said at least one display device to display an initial game outcome comprising a plurality of game symbols displayed relative to each of said first, second, third and fourth reels.

20. The method of claim 12 wherein said step of presenting said initial game outcome comprises displaying a plurality of game symbols relative to each of said first, second, third and fourth reels.

* * * * *